INVENTOR.
HARRY M. LEWIS

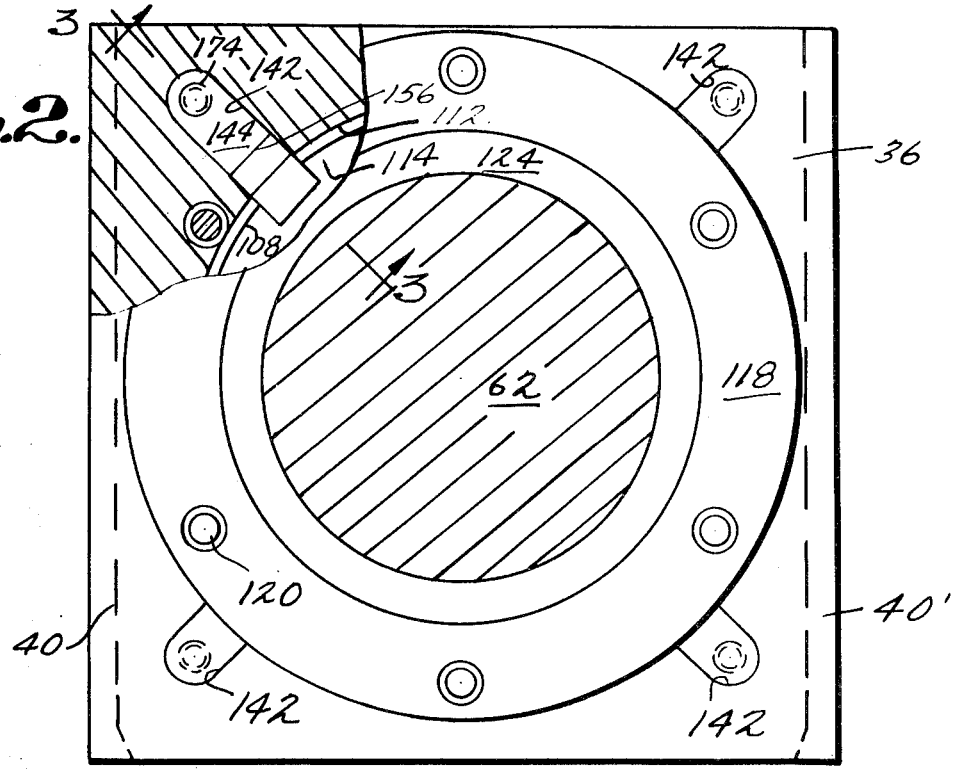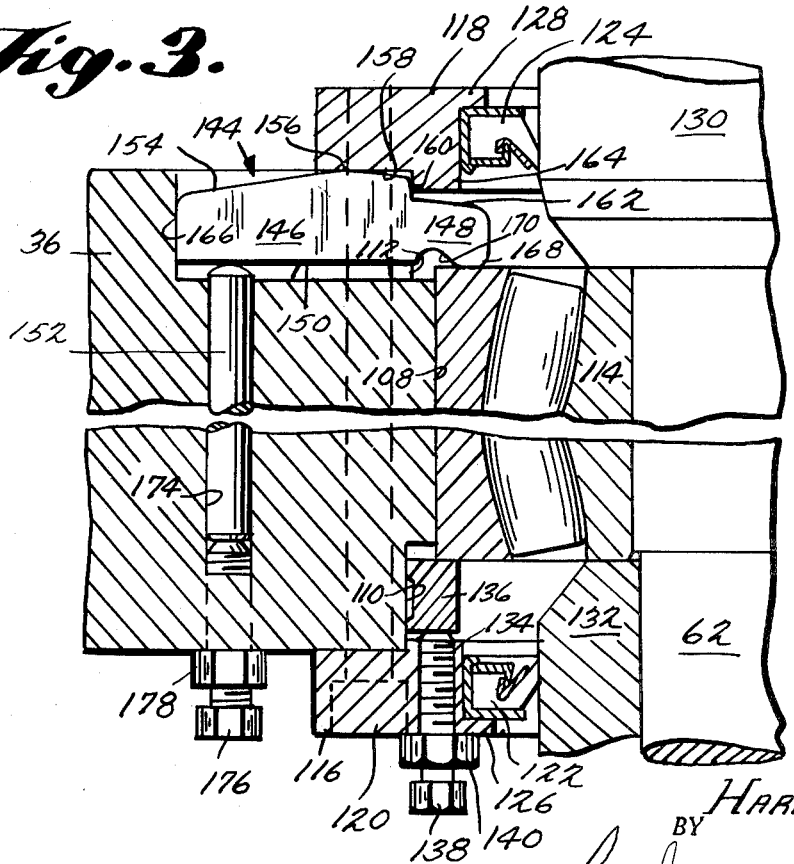

United States Patent Office 3,516,352
Patented June 23, 1970

3,516,352
CAM ACTUATED LOCKING DEVICE
Harry M. Lewis, Springfield, N.J., assignor to Modern Engraving and Machine Corporation, Hillside, N.J. a corporation of New Jersey
Filed Oct. 31, 1967, Ser. No. 679,360
Int. Cl. B44b 5/00
U.S. Cl. 101—23      8 Claims

ABSTRACT OF THE DISCLOSURE

Each axle of a pair of complementary embossing rolls has one end mounted in a floating bearing and the other end mounted in a fixed bearing. One of the fixed bearings is adjustable with the bearing being adjusted and held in place by means of cam actuated locking elements which engage the inner and outer surface of the bearing. Both the inner and outer locking elements can be adjusted from the outer side of the bearing box assembly thereby enabling one of the embossing rolls to be aligned with the other embossing roll after the embossing rolls have been mounted on the embossing machine.

BRIEF DESCRIPTION OF THE INVENTION

This invention relates to an adjustable bearing box assembly and, in particular, to an adjustable bearing box assembly for use on an embossing machine to enable the complementary embossing rolls of the machine to be easily and precisely aligned with each other.

Due to the heat generated in the embossing operation, it is necessary to mount one end of each embossing roll axle in a floating bearing to allow for the expansion of the embossing rolls. It is also necessary to mount the other ends of the embossing roll axles in fixed bearings so that the alignment of the embossing rolls can be maintained throughout the operation of the machine. In order for the embossing machine to function properly, it is essential that the complementary embossing rolls be precisely aligned. To assure the proper alignment between the complementary embossing rolls, one of the embossing roll axles of the present invention is provided with an adjustable fixed bearing box assembly having locking elements that can be actuated from the outer side of the bearing box assembly. This allows the adjustment of the bearing and, consequently, the embossing roll with the embossing roll in place, even though with the roll in place, the inner side of the bearing box is inaccessible.

The adjustable bearing box assembly has a bearing slidably mounted in a chock with a first cam actuated locking means engaging an outer surface of the bearing and the second cam actuated locking means engaging the inner surface of the bearing. The first locking means comprises a collar secured to the outer surface of the chock, a ring interposed between the collar and the outer surface of the bearing and a plurality of bolts which engage the ring and are threadedly mounted in apertures spaced around the collar. The second locking means comprises a collar secured to the inner surface of the chock, apertures extending through the chock, bolts threaded into the outer ends of the apertures, pins carried in and extending beyond the inner ends of the apertures and levers, which pivot on the collar, interposed between the pins and the inner surface of the bearing. With the above arrangement, by turning the bolts from the outer side of the bearing box assembly, the bearing within the assembly can be adjusted, thereby effecting the adjustment of one embossing roll relative to the other embossing roll.

The present invention and its advantages will become more apparent from the following description when taken in combination with the accompanying drawings in which:

FIG. 2 is a view substantially along line 2—2 of FIG. 1; and

FIG. 3 is a sectional view substantially along line 3—3 of FIG. 2.

DETAILED DESCRIPTION OF THE INVENTION

Figure 1:
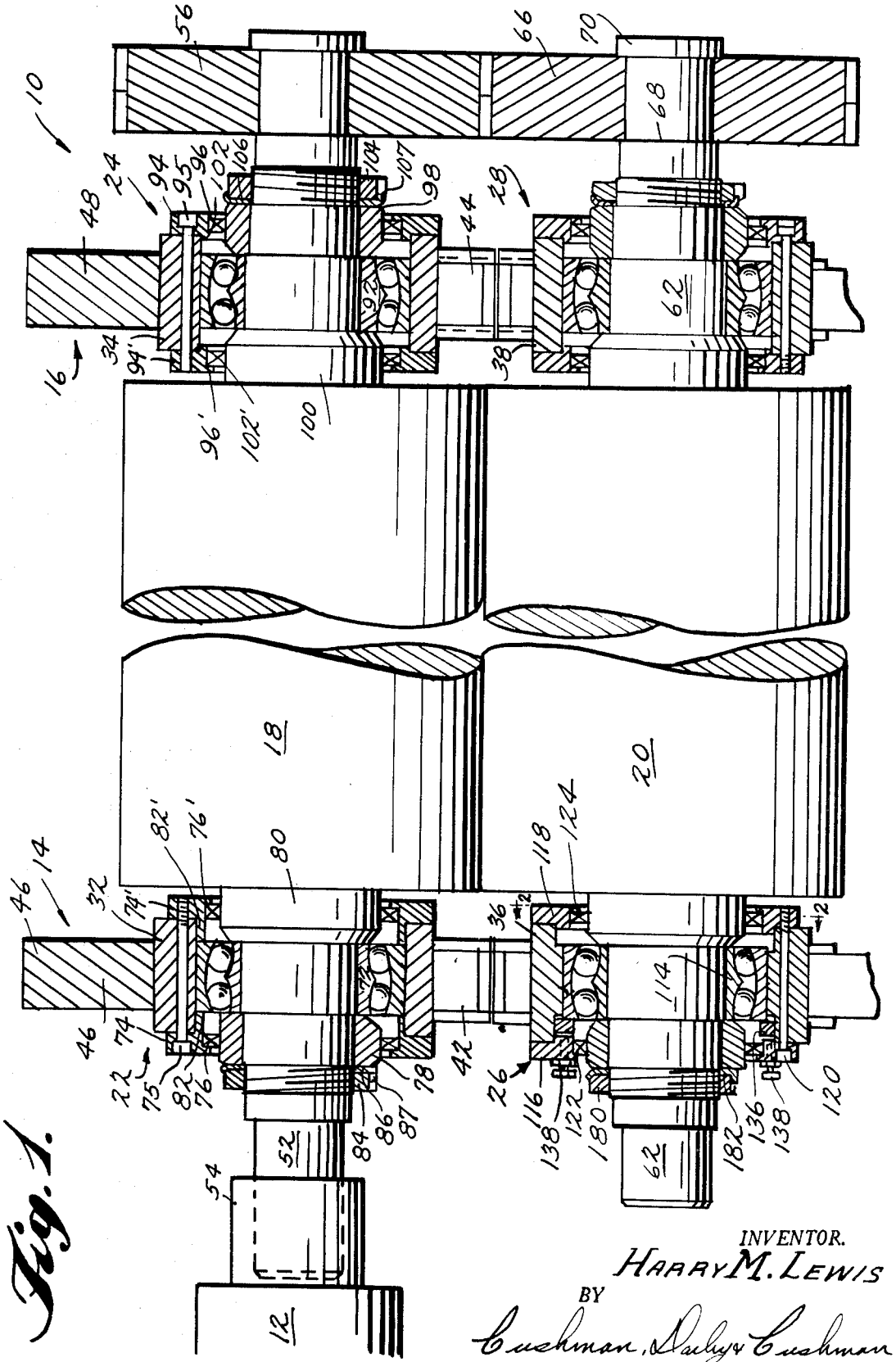
FIG. 1 is a sectional view through the headstock and tailstock of the embossing machine illustrating the relative positions of the various bearing box assemblies.

Referring to FIG. 1, reference character 10 indicates the embossing machine which comprises a conventional drive unit 12, headstock 14, tailstock 16, embossing rolls 18, 20 and bearing box assemblies 22, 24, 26 and 28. Bearing box assemblies 22 and 26 are mounted on the headstock 14, while bearing boxes 24 and 28 are mounted on the tail-stock 16. The chocks 32, 34, 36 and 38 of the respective bearing box assemblies can be mounted on the headstock 14 and tailstock 16 in any suitable manner. However, in the preferred form of the invention, the bearing box assemblies 22, 24, 26 and 28 are mounted on the headstock 14 and tail-stock 16 in the same manner as the bearing box assemblies of my copending application Ser. No. 660,998 filed Aug. 16, 1967 and entitled Micro-Wedge Assembly. The chocks 32, 34, 36 and 38 of the bearing box assemblies are all provided with lateral grooves, like grooves 40, 40' of FIG. 2, and are slidably received between pairs of rails 42 and 44 of the headstock and tailstock, respectively. The upper bearing box assemblies 22, 24 are vertically spaced from the lower bearing box assemblies 26, 28 by the micro-wedge assemblies of my copending application entitled Micro-Wedge Assembly or by similar means such as spacing blocks (not shown). In addition, the lower bearing box assemblies are supported on hydraulic pistons or similar means (not shown) which urge the bearing box assemblies upwardly along the rails and cooperate with the micro-wedge assembly to maintain the embossing rolls in a selected vertical adjustment with the upper bearing box assemblies abutting upper horizontal frame members 46 and 48 of the headstock and tail-stock, respectively.

Axle 52 of embossing roll 18 is coupled at one end by a splined coupling 54 or similar means to conventional drive unit 12. Drive unit 12 is not shown or described in detail since any conventional drive unit can be used and such a description would not aid in the understanding of the present invention.

Herringbone gear 56 is mounted on the other end of axle 52 intermediate shoulder 58 of the axle and collar 60 which can be press fit, welded or otherwise suitably secured to the axle. Gear 56 and axle 52 are keyed together, provided with complementary splines or other conventional means to prevent relative rotation between the axle and the gear. Axle 62 is provided with a herringbone gear 66 which is mounted on axle 62 intermediate shoulder 68 and collar 70 in the same manner as gear 56 is mounted on axle 52. Gear 66 is driven by gear 56 thereby causing embossing roll 20 to rotate along with embossing roll 18 when drive unit 12 is actuated.

Bearing box assembly 22 includes the chock 32 which has a cylindrical interior surface, bearing 72, wiper collars 74, 74', which are secured to the outer and inner surfaces of chock 32 by a plurality of annularly spaced bolts 75 that pass through the chock, and wiper rings 76, 76'. Wiper rings 76, 76' are press fit into or frictionally retained within collars 74, 74' with the wiper rings 76, 76' engaging collar 78 and shoulder 80 of axle 52, respectively, to seal the bearing box assembly so that foreign matter does not enter the assembly. The wiper collars 74, 74' also retain bearing 72 in a fixed position within the assembly and for this reason the collars are provided with opposed annular flanges 82, 82' that are slidably received in chock 32. Flanges 82, 82' extend in the direction of the axle of embossing roll 18 with the free ends of flanges 82, 82' engaging the outer and inner surfaces of bearing 72 to thereby maintain the bearing 72 in a fixed position relative to the headstock 14.

The bearing 72 is also retained in a fixed position on the axle 52 of embossing roll 18 between shoulder 80 and collar 78 which is held against the bearing by means of nut 84. Nut 84 is locked in place by a split lock washer 86 which has tabs 87 that are bent over into grooves in the nut to keep nut 84 from turning. With the above assembly, the axle 52 of embossing roll 18 is rotatably retained in the bearing box assembly 22 in such a manner that no lateral movement of axle 52 relative to headstock 14 is permitted.

Since bearing box assemblies 24 and 28 are identical, the following description of bearing box assembly 24 also applies to bearing box assembly 28. Bearing box assembly 24 includes the chock 34, which has a cylindrical interior surface, floating bearing 92, wiper collars 94, 94', which are secured to the outer and inner surfaces of chock 34 by a plurality of annularly spaced bolts 95 that pass through the chock, and wiper rings 96, 96'. Wiper rings 96, 96' are press fit into or frictionally retained within collars 94, 94' with the wiper rings 96, 96' engaging collar 98 and shoulder 100 of axle 52, respectively, to seal the bearing box assembly so that foreign matter does not enter the assembly. The wiper collars 94, 94' are also provided with opposed annular flanges 102, 102' which are slidably received in the chock to facilitate the proper alignment of the collars with the chock. However, unlike annular flanges 82, 82' of bearing box assembly 22, flanges 102, 102' do not engage the outer and inner surfaces of floating bearing 92 thereby permitting movement of the bearing along the interior surface of the chock 34 when the embossing roll 18 expands or contracts.

Bearings 92 and 72 are mounted on axle 52 in the same manner with bearing 92 being retained in a fixed position on the axle between shoulder 100 and collar 98, which is held against the bearing by means of nut 104. Nut 104 is locked in place by a split lock washer 106 which has tabs 107 that are bent over into grooves in the nut to keep nut 104 from turning. With the above assembly, the axle 52 of embossing roll 18 is rotatably retained in bearing box assembly 24 in such a manner that lateral movement of the axle relative to the tailstock 16 is permitted. Of course, since bearing box assemblies 24 and 28 are identical, axle 62 of embossing roll 20 is rotatably retained in bearing box assembly 28 in the same manner as axle 52 is retained in bearing box assembly 24 so that lateral movement of axle 62 relative to tailstock 16 is permitted to allow for the expansion and contraction of embossing roll 20.

As best shown in FIG. 3, the adjustable bearing box assembly 26 includes chock 36 which comprises a cylindrical bearing engaging surface 108 along with an outer annular groove 110 at one end of surface 108 and inner annular groove 112 at the other end of surface 108 which make the width of bearing engaging portion 108 less than the width of bearing 114. Annular collars 116 and 118 are mounted on the outer surface and inner surface, respectively, of chock 36 by means of annularly spaced bolts 120 which pass through the chock 36. The collars 116, 118 are provided with wiper rings 122, 124 which, as shown in FIG. 3, abut inwardly extending annular flanges 126, 128, respectively, and are press fit or frictionally retained within the collars. The wipers engage shoulder 130 and collar 132 of axle 62 to seal the assembly and insure that foreign matter does not enter the bearing box assembly.

Wiper collar 116 has an inwardly extending annular flange 134 which extends into groove 110 of the chock. A ring 136 is slidably mounted in annular groove 110 intermediate the flange 134 of collar 116 and the outer surface of bearing 114 which extends outwardly beyond the cylindrical bearing engaging surface 108 of the chock. A plurality of cam members, four in the preferred form of the invention, such as bolts 138 pass through collar 116 and are annularly spaced at equal intervals about the collar with the inner ends of the bolts 138 contacting ring 136. The bolts 138, which extend parallel to the longitudinal axis of embossing roll 20, are threaded into or out of the annularly spaced apertures in the collar to effect movement of ring 136 and, consequently, bearing 114 in the direction of the longitudinal axis of the embossing roll 20. The bolts 138 are provided with jamb nuts 140 which are tightened once the desired position of the bearing has been attained thereby locking the bearing at the desired setting.

The inner side of the chock 36 is provided with four grooves 142 which are spaced at equal intervals about and extend radially outwardly from inner annular groove 112. Lever elements 144 are pivotally mounted within the grooves 142. Each lever element 144 is elongated having an enlarged portion 146 and a reduced portion 148 which extends radially inwardly from the enlarged portion 146 and engages the inner surface of bearing 114. The enlarged portion 146 has a flat outer surface 150, which is engaged by pin 152 of one of the cam actuators, and a convex inner surface 154 with an apex 156 which pivots on surface 158 of the inner wiper collar 118.

The reduced portion 148 of each lever element 144 is offset, with respect to the longitudinal center line of the lever element, forming a shoulder 160 between the inner surface 162 of the reduced portion and the inner surface 154 of the enlarged portion. Shoulder 160 slidably engages an annular flange 164 of the inner wiper collar 118, while surface 166 of the lever element slidably engages the end of groove 142 to keep the lever element 144 in place. The outer surface 168 of the reduced portion has a groove 170 intermediate the bearing engaging tip and the enlarged portion 146 to insure that contact is not made between the edge of the bearing and portions of the lever element other than the tip when lever element 144 is pivoted.

The chock 36 is provided with a plurality of apartures 174 which extend parallel to the axis of embossing roll 20 from the outer surface of the chock to the grooves 142. These apertures 174 have threaded outer portions with camming members such as bolts 176 mounted therein and smooth inner portions with pins 152 slidably mounted therein. Since pins 152 are interposed between and normally engage bolts 176 and levers 144, the actuation of bolts 176 effect the movement of bearing 114. Jamb nuts 178 are mounted on bolts 176 intermediate the head of the bolts and the outer surface of the chock to lock the bolts in position once the bearing has been properly adjusted.

The bearing 114 is mounted on axle 62 of embossing roll 20 between shoulder 130 of the axle and collar 132. Collar 132 is urged inwardly against bearing 114 by means of nut 180 which is locked in place by means of a split lock washer 182 in the same manner as discussed above in connection with the other collar retaining nuts. Although bearing 114 and the other bearings shown in the drawings are spherical roller bearings, it is contemplated that other forms of bearings can also be utilized in the present invention.

In operation, after the bearing box assemblies have been mounted on the headstock 14 and tailstock 16, bolts 138 and bolts 176 are actuated to move the bearing 114 and, consequently, embossing roll 20 relative to embossing roll 18 to properly align the conplementary embossing rolls. While the movement of embossing roll 20 relative to embossing roll 18 is generally slight, it must be stressed that the rolls need to be precisely aligned if the embossing machine is to function properly.

When it is desired to move the lower embossing roll to the right, as viewed in FIG. 1, bolts 176 are loosened thereby disengaging bolts 176 and pins 152. Next, bolts 138 are tightened, moving bearing 114 to the right and causing levers 144 to pivot in a counter-clockwise manner as viewed in FIG. 3 until pins 152 again engage bolts 176. Of course, if it is desired to move the embossing roll to the left, bolts 138 are first loosened thereby disengaging the bolts from ring 136. Then bolts 176 are threaded into apertures 174 thereby causing levers 144 to pivot in a clockwise manner as viewed in FIG. 3 moving the bearing 114 to the right until ring 136 again engages bolts 138.

What is claimed is:

1. An adjustable bearing box assembly comprising:
   a bearing slidably mounted in a chock, said bearing being slidable in a direction parallel to the central axis of rotation of the bearing, and said bearing having an outer surface and an inner surface extending substantially radially with respect to said central axis of rotation,
   first cam actuated locking means engaging said outer surface of said bearing, said first cam actuated locking means being carried by said bearing box assembly, and said first cam actuated locking means being adjustable from an outer side of said bearing box assembly, and
   second cam actuated locking means engaging said inner surface of said bearing, said second cam actuated locking means being carried by said bearing box assembly, and said second cam actuated locking means being adjustable from said outer side of said bearing box assembly to enable said bearing to be positioned and locked in place from the outer side of said bearing box assembly by effecting an adjustment through said first and second cam actuated locking means.

2. An adjustable bearing box assembly comprising:
   a bearing slidably mounted in a chock, said bearing being slidable in a direction parallel to the central axis of rotation of the bearing, and said bearing having an outer surface and an inner surface extending substantially radially with respect to said central axis of rotation,
   first cam actuated locking means adjustable from an outer side of said bearing box assembly, said first cam actuated locking means comprising a collar secured to the outer surface of said chock, a ring interposed between said collar and the outer surface of the bearing, said ring engaging the outer surface of said bearing, and at least one cam element carried by said collar and engaging said ring, and
   second cam actuated locking means engaging said inner surface of said bearing, said second cam actuated locking means being adjustable from said outer side of said bearing box assembly to enable said bearing to be positioned and locked in place from the outer side of said bearing box assembly by effecting an adjustment through said cam element of said first cam actuated locking means and said second cam actuated locking means.

3. In the adjustable bearing box assembly of claim 2: each cam element comprising a bolt threadedly mounted in the collar and having a locking means thereon for securing said bolt in place once the desired adjustment of the bearing is obtained.

4. An adjustable bearing box assembly comprising:
   a bearing slidably mounted in a chock, said bearing being slidable in a direction parallel to the central axis of rotation of the bearing, and said bearing having an outer surface and an inner surface extending substantially radially with respect to said central axis of rotation,
   first cam actuated locking means engaging said outer surface of said bearing, said cam actuated locking means being adjustable from an outer side of said bearing box assembly, and
   second cam actuated locking means adjustable from said outer side of said bearing box assembly, said second cam actuated locking means comprising at least one lever intermediate the inner surface of the bearing and cam means, said lever engaging said cam means and said inner surface of said bearing, said cam means accessible from the outer side of said adjustable bearing assembly, and said cam means adapted to pivot said lever about a fulcrum point of said lever with the adjustment of said lever through said cam means in cooperation with the adjustment of said first cam actuated locking means effecting movement of said bearing to enable said bearing to be positioned and locked in place from the outer side of said bearing box assembly.

5. In the adjustable bearing box assembly of claim 4: a collar secured to the inner surface of the chock, the fulcrum point of the lever engaging said collar, and said fulcrum point being intermediate the bearing and the cam means.

6. In the adjustable bearing box assembly of claim 4: the cam means for pivoting said lever comprising an aperture passing through said chock, a bolt threaded into the outer end of said aperture and a pin slidably carried in said aperture intermediate said lever and said bolt with said pin engaging said lever and said bolt.

7. An adjustable bearing box assembly comprising:
   a bearing slidably mounted in a chock, said bearing being slidable in a direction parallel to the central axis of rotation of said bearing and said bearing having an outer surface and an inner surface extending substantially radially with respect to said central axis of rotation;
   first cam actuated locking means engaging said outer surface of said bearing, said first cam actuated locking means comprising a collar carried on the outer surface of said chock, a ring intermediate said collar and said outer surface of said bearing, and at least one cam element carried by said collar with said ring engaging said outer surface of said bearing and said cam element, and
   second cam actuated locking means engaging said inner surface of said bearing, said second cam actuated locking means comprising a collar carried on an inner surface of said chock, at least one lever intermediate said inner surface of said bearing and cam means, said lever engaging said cam means and said inner surface of said bearing, said cam means capable of actuation from the outer side of said adjustable bearing assembly and said cam means adapted to pivot said lever to effect movement of said bearing with the adjustment from the outer side of the bearing box assembly of said first cam actuated locking means and said second cam actuated locking means positioning said bearing and locking said bearing in position.

8. An embossing machine comprising:
   a first embossing roll with a first axle, one end of said first axle being mounted in a fixed bearing box assembly of said embossing machine and the other end of said first axle being mounted in a floating bearing box assembly of said embossing machine to permit movement of said first axle caused by expansion and contraction of said first embossing roll,
   a second complementary embossing roll with a second axle, one end of said second axle being mounted in an adjustable bearing box assembly of said embossing machine and the other end of said second axle being mounted in a floating bearing box assembly of said embossing machine to permit movement of said second axle caused by expansion and contraction of said second embossing roll,
   said adjustable bearing box assembly comprising a bearing slidably mounted in a chock, said bearing being slidable in a direction parallel to the axis of the said second embossing roll and said bearing having an outer surface and an inner surface extending substantially radially with respect to said axis of said second embossing roll, first cam actuated locking means engaging said outer surface of said bearing, said first cam actuated locking means for positioning said bearing and locking said bearing in place and said first cam actuated locking means being adjustable from an outer side of said bearing box assembly, and second cam actuated locking means engaging said inner surface of said bearing, said second cam actuated locking means for positioning said bearing and locking said bearing in place, and said second cam actuated locking means being adjustable from said outer side of said bearing box assembly with the adjustment of said first cam actuated locking means and said second cam actuated locking means effecting the adjustment of said second embossing roll relative to said first embossing roll to properly align said embossing rolls.

References Cited

UNITED STATES PATENTS

| | | | |
|---|---|---|---|
| 519,961 | 5/1894 | Maloy | 101—23 |
| 2,174,728 | 10/1939 | Potdevin | 101—248 |
| 2,182,012 | 12/1939 | Bunnell | 308—35 |
| 2,681,611 | 6/1954 | Jacobs | 101—23 |
| 3,147,702 | 9/1964 | Martin | 101—248 |

FOREIGN PATENTS 742,322  12/1955  Great Britain.

ROBERT E. PULFREY, Primary Examiner

C. D. CROWDER, Assistant Examiner

U.S. Cl. X.R.

308—59, 207; 101—248